(12) United States Patent
Honary et al.

(10) Patent No.: US 7,242,687 B2
(45) Date of Patent: Jul. 10, 2007

(54) METHOD AND SYSTEM FOR DISTRIBUTION OF SESSION SCHEDULING

(75) Inventors: Hooman Honary, Newport Coast, CA (US); Dianne L. Steiger, Irvine, CA (US)

(73) Assignee: Intel Corporation, Santa Clara, CA (US)

( * ) Notice: Subject to any disclaimer, the term of this patent is extended or adjusted under 35 U.S.C. 154(b) by 1016 days.

(21) Appl. No.: 10/155,521

(22) Filed: May 24, 2002

(65) Prior Publication Data

US 2003/0219020 A1    Nov. 27, 2003

(51) Int. Cl.
*H04L 12/28* (2006.01)
(52) U.S. Cl. .................. 370/395.41; 370/468
(58) Field of Classification Search ............ None
See application file for complete search history.

(56) References Cited

U.S. PATENT DOCUMENTS

| | | | |
|---|---|---|---|
| 5,598,417 A * | 1/1997 | Crisler et al. ............... 370/348 |
| 5,982,780 A * | 11/1999 | Bohm et al. ................. 370/450 |
| 6,130,886 A * | 10/2000 | Ketseoglou et al. ......... 370/347 |
| 6,259,705 B1 * | 7/2001 | Takahashi et al. ........... 370/465 |
| 6,427,170 B1 * | 7/2002 | Sitaraman et al. .......... 709/226 |
| 6,466,557 B1 * | 10/2002 | Doi ............................. 370/332 |
| 6,512,771 B1 * | 1/2003 | Atarashi et al. ......... 370/395.4 |
| 6,667,972 B1 * | 12/2003 | Foltan et al. ................ 370/354 |
| 6,826,160 B1 * | 11/2004 | Wang et al. ................. 370/329 |
| 2002/0191588 A1 * | 12/2002 | Personick ................... 370/352 |

* cited by examiner

*Primary Examiner*—Phirin Sam
(74) *Attorney, Agent, or Firm*—Blakely, Sokoloff, Taylor & Zafman LLP

(57) ABSTRACT

In one embodiment of the invention, a method, system, and apparatus provide a substantially balanced distribution of multiple communication sessions across multiple processing timeslots. When a request to establish a communication session is received, a processing timeslot is allocated and associated with that communication session according to a load balancing scheme to distribute communication sessions across the processing timeslots. Subsequent information for a communication session is processed during the allocated timeslot for that communication session.

36 Claims, 3 Drawing Sheets

METHOD AND SYSTEM FOR DISTRIBUTION OF SESSION SCHEDULING

FIELD

Various embodiments of the invention pertain, generally, to processor task scheduling. More particularly, at least one embodiment of the invention relates to start-up distribution of processing jobs, tasks, or sessions.

BACKGROUND

Digital signal processors (DSP) are widely employed to process data streams (frames/packets) and/or tasks. Other types of processor, such as reduced instruction set computer (RISC), are often employed along with DSPs in various applications.

Combined RISC-DSP architectures are used in many communication systems, where the RISC processor typically takes care of the scheduling, setup, and/or teardown of the communication channels (sessions), and the DSP(s) typically performs the data processing. In emerging architectures, many communication sessions (e.g., hundreds) are supposed to be handled by the same RISC processor. A "session" may be a particular communication link (e.g., a call), and include multiple parts (e.g., frames). One or more job requests may be necessary to process each part (e.g., frame) of the communication session. In various implementations, a communication session may carry Voice (e.g., voice-over-packet), data, video, music, etc.

Typically, communication sessions are established between a client device and a host device, with the host device possibly servicing multiple communication sessions. A RISC-DSP architecture may be employed by the host device to process one or more communication sessions.

Generally, a new session start request, corresponding to a new communication session, causes a session identifier to be allocated for said communication session. The session identifier is then associated with a particular periodic processing timeslot, such that all subsequent session information is processed during the same periodic timeslot in subsequent processing cycles. That is, the periodic processing timeslot where the session is started, and consequently subsequent frames are received, is decided based on the session start request. Typically, a host device merely associates a communication session with the current timeslot at the time the communication session start request is received. No load balancing of timeslot distribution occurs in the conventional method.

A problem arises where the response time of the processor (e.g., RISC) for the scheduling tasks/jobs becomes unpredictable. For example, session start requests for many or all active communication sessions may appear nearly simultaneously or relatively close in time. Consequently, the amount of time required for the processor to hand over the session(s) processing to other dedicated processors (e.g., DSPs) can vary significantly between, say, the second communication session and the ninetieth communication session. To make matters worse, the delay for each communication session may vary from processing timeslot to processing timeslot, depending on how many live sessions exist prior to it in a particular timeslot. This variable delay in session scheduling translates into increased jitter in the data path, hence degrading the performance of the communication session. This tends to degrade the quality of sessions where real-time or pseudo, substantially, or near real-time communications are desired, such as voice-over-IP communications.

DETAILED DESCRIPTION

In the following detailed description of various embodiments of the invention, numerous specific details are set forth in order to provide a thorough understanding of various aspects of one or more embodiments of the invention. However, one or more embodiments of the invention may be practiced without these specific details. In other instances, well known methods, procedures, and/or components have not been described in detail so as not to unnecessarily obscure aspects of embodiments of the invention.

In the following description, certain terminology is used to describe certain features of one or more embodiments of the invention. For instance, "frame" and/or "packet" (used interchangeably) includes any block or arrangement of data or information. The term "information" includes voice, data, address, and/or control. The term "session" includes any particular logical or physical communication link (e.g., a voice-over-packet call), and may include multiple parts (e.g., frames, packets, etc.). A "Voice-over-Packet (VoP) system" can be generally defined as logic that receives, processes and transmits information (e.g., data, address, control, voice or a combination thereof) in a prescribed format. Each VoP system may be configured to support multiple types of networks. "Logic" is defined as hardware, firmware, software or any combination thereof. For instance, internal logic within the VoP system may include a processor, which is hardware operating in combination with firmware or software to process information. There exist various types of processors such as a signal processor that processes audio (e.g., voice) and perhaps other types of information. The term "packet" is generally defined as a series of information bits sent over a packet-switched network. Examples of packet-switched networks include Asynchronous Transfer Mode (ATM), frame relay, Internet Protocol (IP). These packets are routed over communication paths, which are formed using information-carrying mediums such as electrical wire, optical fiber, cable, bus, air in combination with wireless signaling technology or any combination thereof. Other measurements of bit or byte lengths include a segment, block or data element.

One aspect of an embodiment of the invention provides a method, system, and apparatus for balancing the distribution of processing timeslots in a multi-session communication system (e.g., a voice-over-packet communication system or device). In one implementation of this aspect of the invention, processing timeslots are associated with newly established communication sessions (e.g., voice-over-packet calls) and/or start of sessions according to a load balancing scheme that distributes the assignment of communication sessions across all, a subset, or available, processing timeslots.

Figures 1, 2:
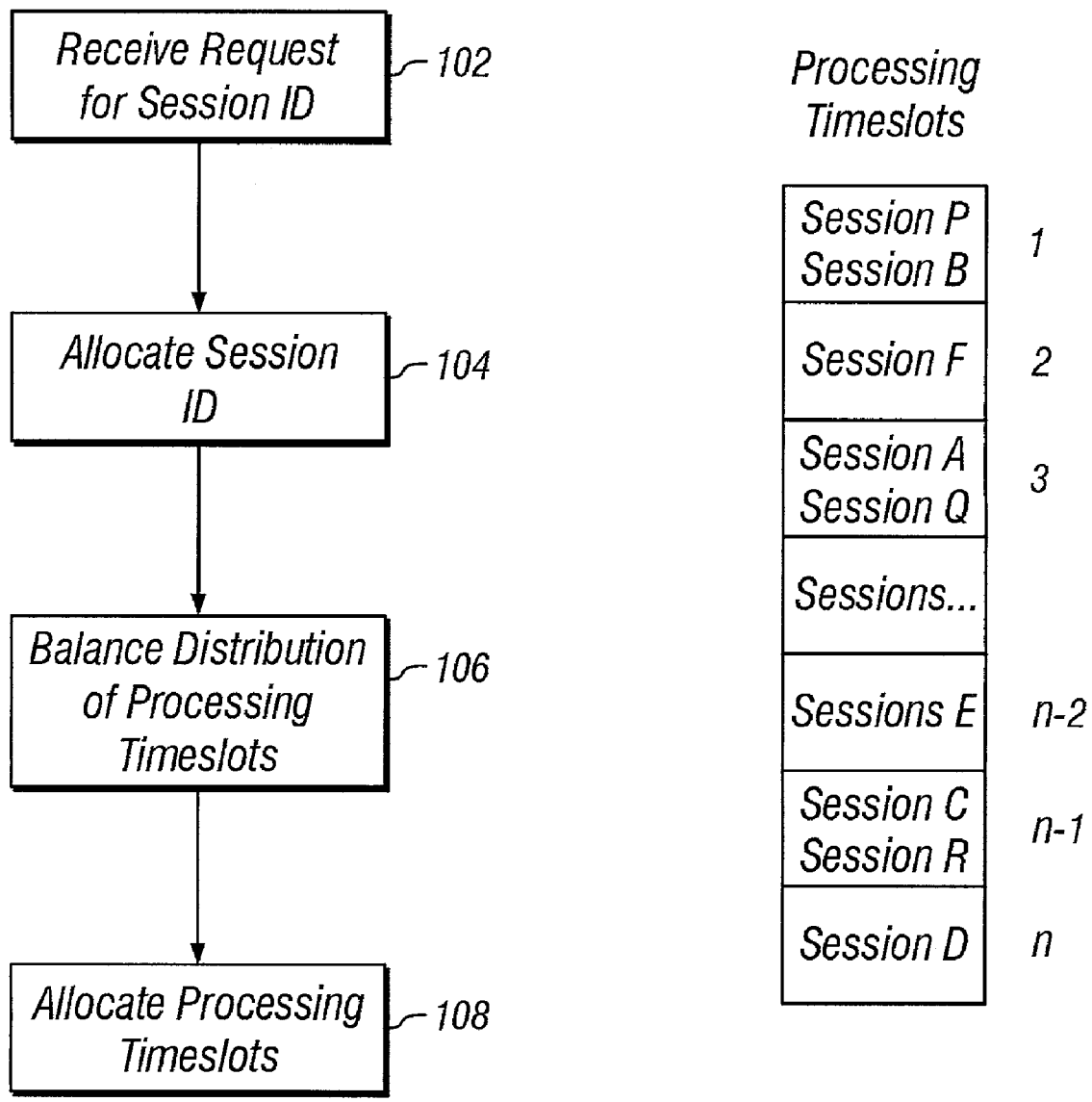
FIG. 1 illustrates one method for balancing the distribution of processing timeslots in a multi-session communication system according to one embodiment of the invention.
FIG. 2 illustrates an example of a how communication sessions may be distributed across processing timeslots according to one embodiment of the invention.

FIG. 1 illustrates one method for balancing the distribution of processing timeslots in a multi-session communication system (e.g., a voice-over-packet system) according to one embodiment of the invention. Typically, when a session is initiated, a session identifier is requested by the client from the host 102. A Session ID is then allocated to the requesting client 104. The Session ID is used by the communication system to identify the different parts (e.g., packets, frames, sections, etc.) of the same session during the transmission process. Under the conventional approach, a host receiving a session identifier request (Session ID Request) allocates a Session ID and associates that Session ID with a processing timeslot. Subsequent session information (e.g., packets, frames, etc.) is transmitted, with this Session ID to identify it, during or synchronous with the associated processing timeslot. That is, once a particular periodic processing timeslot is assigned to a session, all subsequent information for that session is transmitted synchronous with, and/or processed during, that assigned timeslot.

However, associating a session with a processing timeslot without regard for the distribution of prior or current communication sessions across processing timeslots may cause variable delays in processing communication sessions. As noted above, this may introduce jitter and degrade the performance of a communication session.

To prevent and/or reduce these variable delays and jitter, the distribution of processing timeslots for communication sessions is balanced 106. That is, active communication sessions are distributed across the available processing timeslots so as to balance processor usage and evenly distribute processing delays. Balanced distribution of processing timeslots 106 may be accomplished by maintaining data or information on the current distribution or usage of processing timeslots. Once a processing timeslot that satisfies the load balancing objective is identified, it is allocated and associated to the new Session ID 108.

Generally, a balanced distribution scheme includes the uniform (or substantially uniform) allocation of sessions across all (or some chosen range) of processing timeslots. That is, in one example, as new session requests are received, each session is allocated a processing timeslot in any manner that results in a substantially uniform distribution of the active sessions across all processing timeslots.

FIG. 2 illustrates an example of a how communication sessions or Session IDs may be distributed in a balanced manner across processing timeslots 1 through n, where n is a positive integer, according to one embodiment of the invention. As new Session IDs (Sessions A, B, C, D, E, and F) are allocated, they are evenly or substantially evenly distributed across processing timeslots 1 through n. When substantially all of the timeslots have a been associated with one Session ID, subsequent Session IDs (Sessions P, Q, and R) are evenly or substantially evenly distributed across processing timeslots 1 through n. In one implementation, processing timeslots 1 through n are cyclical timeslots; that is, they are processed in a repeating cycle of 1 through n. More than one session ID may be allocated to, or associated with, a given processing timeslot (e.g., Session A and Session Q are associated with timeslot 3).

In various implementations, a balanced distribution of Session IDs across processing timeslots may be accomplished in a different manner without deviating from the invention. For example, in one embodiment of the invention, balanced distribution of communication sessions may mean that there is a difference of no more than a threshold number of sessions between processing timeslots. That is, the difference in associated sessions between the processing timeslot with the most number of associated sessions and the processing timeslot with the least number of associate sessions is, for instance, three sessions or less. In other embodiments of the invention, different criteria or number of sessions (e.g., one, two, four, ten, etc.), or a percentage difference, may be employed in defining a balanced session distribution system. In yet other implementations, a probabilistic approach may be employed.

In one implementation, the allocation of a processing timeslot for a given session indicates to the corresponding transmitting client when to send subsequent communication session information (e.g., frames or packets). That is, the client may transmit subsequent session information substantially synchronous with the processing timeslot allocated to that particular session.

Figure 3:
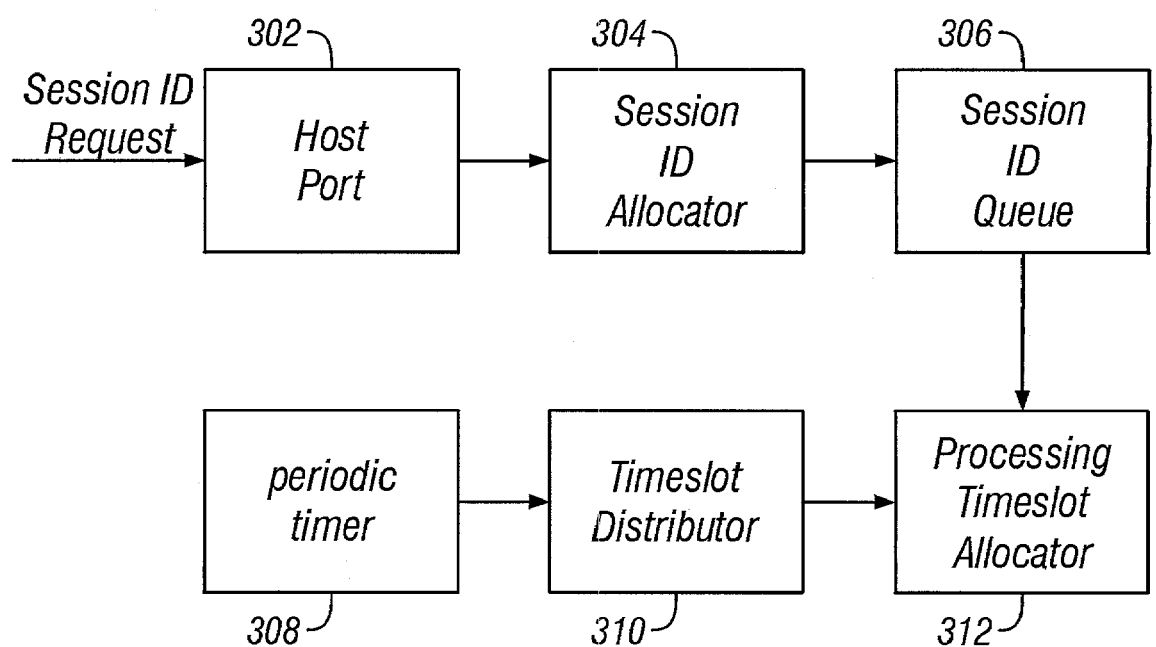
FIG. 3 is a block diagram illustrating the allocation of processing timeslots according to one embodiment of the invention.

FIG. 3 is a block diagram illustrating the allocation of processing timeslots according to one embodiment of the invention. A host port 302 receives requests for Session IDs from clients. This request is passed to a Session ID Allocator 304 which allocates a session identifier (e.g., a unique number). Once a Session ID is allocated, it is placed in a Session ID Queue 306 to be associated with a processing timeslot. A periodic Event Timer 308 may be employed to trigger a Processing Timeslot Distributor 310 to manage the allocation of session. The periodic Event Timer 308 may be synchronous to the occurrence or period of the processing timeslots.

The Processing Timeslot Distributor 310 may use various schemes to manage the balanced distribution of session in the Session ID Queue 306 across the available timeslots. In various implementations of the invention, a deterministic or probabilistic, and/or random load balancing scheme may be employed. For example, in one deterministic approach, the Timeslot Distributor 310 may maintain information on processing timeslot usage such as a list of current sessions per associated processing timeslot. This would enable an intelligent load balancing scheme to be implemented which takes into account current processing loads. In yet other implementations of the invention, based on a probabilistic approach for instance, a distribution hopping scheme may be employed by the Timeslot Distributor 310 to spread-out sessions in a substantially even or balanced manner. In yet another embodiment of the invention, a random or pseudo-random distribution scheme with certain knowledge of the current timeslot usage may be employed to allocate sessions across the processing timeslots.

Once the Timeslot Distributor 310 has determined an appropriate timeslot for balanced distribution, a Timeslot Allocator 312 associates a selected timeslot with a given Session ID. All information associated with the corresponding Session ID may subsequently be processed only during the selected processing timeslot. In one implementation, a client device only sends information for a particular session synchronous to the associated processing timeslot for the given session. That is, once a Session ID and processing timeslot have been assigned to, or associated with, a session, both of these parameters are communicated to a client device to synchronize the transmission of subsequent session information accordingly.

In some instances, the balanced distribution system for processing timeslots may delay the initial startup of a communication session. The balanced allocation of processing timeslots for communication sessions may, in some implementations, delay the start of a communication session. That is, rather than automatically assigning the most current processing timeslot as soon as a Session ID request is received, a later processing timeslot may be allocated and assigned based on load balancing considerations. In one implementation, assigning a later processing timeslot (a timeslot not currently being processed) to a particular session may cause the client to delay the start of periodic transmissions of session information to the host.

Figure 4:
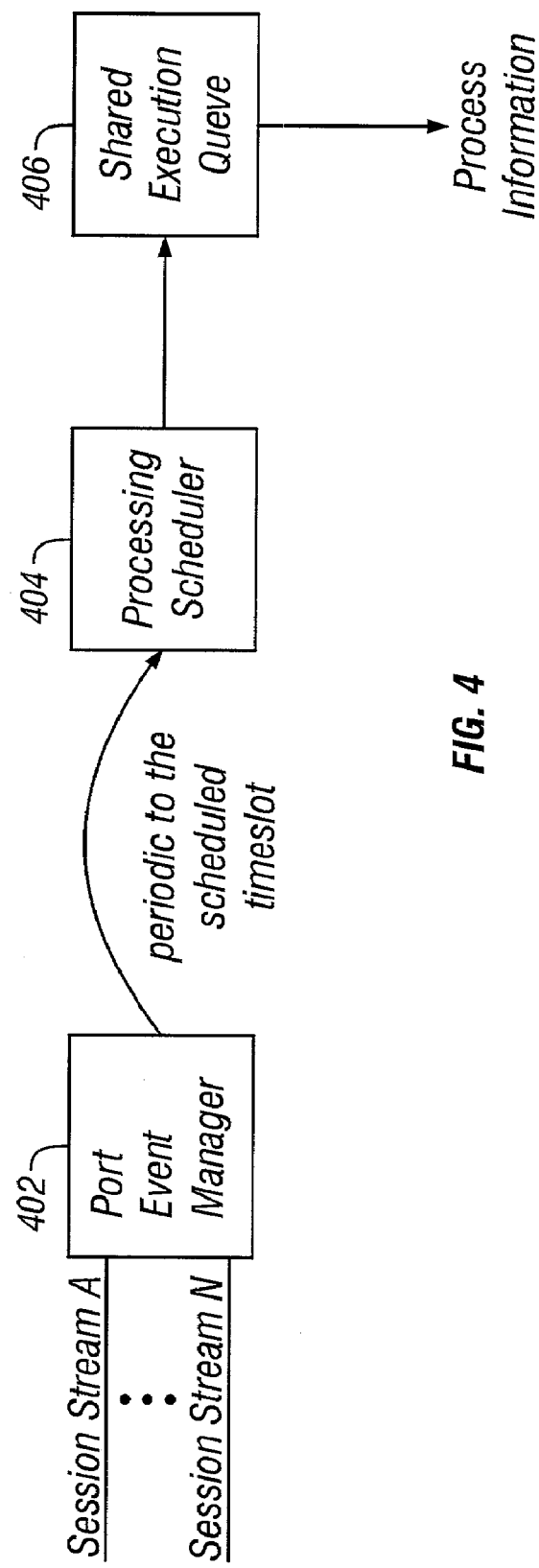
FIG. 4 is a block diagram illustrating the processing of session data streams according to one embodiment of the invention.

FIG. 4 is a block diagram illustrating the processing of session information streams (e.g., packets or frames) according to one embodiment of the invention. Information for a given communication session arrives from a client to the host port event manager 402. The port event manager 402 may receive and buffer information (e.g., frames or packets) corresponding to different communication sessions. The information transmitted to the host port 402 by the client device may be asynchronous to the initial request by the client to establish a communication session. In various implementations, the port event manager 402 may include a Time Division Multiplexed (TDM) serial port, a parallel port, and other types of communication ports and related software, firmware, and hardware. In one implementation, the information sent by the client to the host port 402 is synchronous with the processing timeslot assigned or allocated to the particular communication session.

The information received at by the port event manager 402 for any particular session is transferred to a processing scheduler 404 synchronous to the scheduled, assigned, and/or allocated processing timeslot for the particular communication session. The processing scheduler places the information (e.g., packet or frame) into a shared execution queue 406 from where it may be accessed by processing resources (e.g., DSPs) and processed.

One or more aspects of the invention described herein may be implemented to enable a processor (e.g., RISC) to more efficiently handle the processing of communication sessions. For example, multiple communication sessions may be managed by a RISC to evenly, or substantially evenly distribute, session start cycles, and consequently the processing loads, across the range of all, or available, processing timeslots.

The different aspects of the invention may be implemented in a RISC-DSP apparatus or device for processing multiple voice communication sessions (e.g., packet voice communications, voice-over-packets, etc.). For example, RISC may be configured to implement the balanced distribution of periodic processing timeslots when a communication session is established while one or more DSPs handle the processing of subsequent session information (e.g., compressed or uncompressed voice packets, etc.).

One or more aspects of the invention may be practiced as part of a voice communication system and/or voice communication network to provide a balanced distribution of communication sessions (e.g., voice-over-packet calls) across processing timeslots of a voice-over-packet server, processor, telephony gateway, communication base-station, and/or other communication device.

While certain exemplary embodiments of the invention have been described and shown in the accompanying drawings, it is to be understood that such embodiments of the invention are merely illustrative of and not restrictive on the broad aspects of various embodiments of the invention, and that these embodiments of the invention not be limited to the specific constructions and arrangements shown and described, since various other modifications are possible.

Additionally, it is possible to implement the embodiments of the invention or some of their features in hardware, programmable devices, firmware, software or a combination thereof.

What is claimed is:

1. A method comprising:
   receiving a request to establish a communication session;
   allocating a processing timeslot, from among multiple periodic processing timeslots, to the communication session in a balanced manner to achieve a substantially uniform distribution of communication session allocations across the multiple processing timeslots;
   allocating a session identifier to the communication session;
   associating the communication session with the session identifier; and
   communicating the session identifier to a client, the session identifier employed to identify subsequent session information, wherein the client transmits subsequent information corresponding to the communication session synchronous to the allocated processing timeslot.

2. The method of claim 1 wherein allocating the processing timeslot to the communication session in a balanced manner includes,
   selecting the processing timeslot, from among the multiple processing timeslots, to maintain a substantially uniform number of allocated communication sessions across the multiple processing timeslots.

3. The method of claim 1 further comprises:
   associating the processing timeslot with the communication session.

4. The method of claim 1 wherein allocating the processing timeslot to the communication session in a balanced manner includes,
   maintaining information related to the usage of the multiple processing timeslots, and
   allocating processing timeslots for previously presented communication sessions according to a load balancing scheme based on the usage information for the multiple processing timeslots.

5. The method of claim 4 wherein maintaining information related to the usage of the multiple processing timeslots includes
   maintaining a count of the number of communication sessions associated with each of the multiple processing timeslots.

6. The method of claim 1 wherein allocating the processing timeslot to the communication session in a balanced manner includes,
   distributing communication sessions across the multiple processing timeslots such that there is a difference of less than a threshold percentage of communication sessions across the multiple processing timeslots.

7. The method of claim 1 wherein allocating the processing timeslot to the communication session in a balanced manner includes,
   distributing communication sessions across the multiple processing timeslots such that there is a difference of less than a threshold number of communication sessions across the multiple processing timeslots.

8. The method of claim 1 wherein the communication sessions are substantially uniformly distributed between the multiple processing timeslots.

9. The method of claim 1 wherein the multiple processing timeslots are cyclical.

10. The method of claim 1 wherein the multiple processing timeslots have substantially equal processing time.

11. A device comprising:
a port to receive requests to establish communication sessions;
a timeslot distributor to distribute processing timeslots for communication sessions across multiple processing timeslots according to a load balancing scheme;
a timeslot allocator communicatively coupled to the timeslot distributor and the port, the timeslot allocator to allocate processing timeslots for communication sessions; and
a session identifier allocator coupled to the port, the session identifier allocator to assign an identifier to each communication session received.

12. The device of claim 11 further comprising:
a queue coupled to the session identifier allocator, the queue to store the assigned session identifiers.

13. The device of claim 11 further comprising:
a periodic timer coupled to the timeslot distributor, the periodic timer to provide an event trigger synchronous with the processing timeslots.

14. The device of claim 11 wherein the timeslot distributor distributes processing timeslots for communication sessions such that there is a difference of less than a threshold percentage of communication sessions across the multiple processing timeslots.

15. The device of claim 11 wherein the timeslot distributor distributes processing timeslots for communication sessions such that there is a difference of less than a threshold number of communication sessions across the multiple processing timeslot.

16. The device of claim 11 wherein the communication sessions are substantially uniformly distributed between the multiple processing timeslots.

17. The device of claim 11 wherein the multiple processing timeslots are cyclical have substantially equal processing time.

18. A device comprising:
receiving means for receiving requests to establish communication sessions;
distribution means for distributing processing timeslots for communication sessions across multiple processing timeslots according to a load balancing scheme;
timeslot allocation means for allocating processing timeslots for communication sessions, the timeslot allocation means being coupled to the distribution means and the receiving means; and
session identifier allocation means for assigning an identifier to each communication session received, the session identifier allocation means being coupled to the receiving means.

19. The device of claim 18 further comprising:
a periodic timer coupled to the timeslot distributor, the periodic timer to provide an event trigger synchronous with the processing timeslots.

20. The device of claim 18 wherein the communication sessions are substantially uniformly distributed between the multiple processing timeslots.

21. A machine-readable medium having one or more instructions for balancing the allocation of processing timeslots, which when executed by a processor, causes the processor to perform operations comprising:
allocate a processing timeslot, from among multiple periodic processing timeslots, to a communication session;
distribute the allocation of processing timeslots for communication sessions substantially uniformly across the multiple periodic processing timeslots;
allocate a session identifier to the communication session;
associate the communication session with the session identifier; and
communicate the session identifier to a client, the session identifier employed to identify subsequent session information and wherein the client transmits subsequent information corresponding to the communication session synchronous to the allocated processing timeslot.

22. The machine-readable medium of claim 21 having one or more instructions which cause the processor to further perform operations comprising:
receive a request to establish the communication session.

23. The machine-readable medium of claim 21 having one or more instructions which cause the processor to further perform operations comprising:
associate the processing timeslot with the communication session.

24. A method comprising:
receiving a request to establish the communication session;
maintaining information related to usage of multiple processing timeslots including maintaining a count of the number of communication sessions associated with each of the multiple processing timeslots; and
allocating a processing timeslot, from among the multiple periodic processing timeslots, to the communication session according to a load balancing scheme based on the usage information for the multiple processing timeslots to achieve a substantially uniform distribution of communication session allocations across the multiple processing time slots.

25. The method of claim 24 further comprising:
allocating a session identifier to the communication session;
associating the communication session with the session identifier; and
communicating the session identifier to a client, the session identifier employed to identify subsequent session information, wherein the client transmits subsequent information corresponding to the communication session synchronous to the allocated processing timeslot.

26. A method comprising:
receiving a request to establish a communication session;
allocating a processing timeslot, from among multiple periodic processing timeslots, to the communication session in a balanced manner to achieve a substantially uniform distribution of communication session allocations across the multiple processing timeslots;
distributing communication sessions across the multiple processing timeslots such that there is a difference of less than one of a threshold percentage and a threshold number of communication sessions across the multiple processing timeslots;
allocating a session identifier to the communication session;
associating the communication session with the session identifier; and
communicating the session identifier to a client, the session identifier employed to identify subsequent session information, wherein the client transmits subsequent information corresponding to the communication session synchronous to the allocated processing timeslot.

27. A device comprising:
a port to receive requests to establish communication sessions;
a timeslot distributor to distribute processing timeslots for communication sessions across multiple processing timeslots according to a load balancing scheme;
a timeslot allocator communicatively coupled to the timeslot distributor and the port, the timeslot allocator to allocate processing timeslots for communication sessions; and
a periodic timer coupled to the timeslot distributor, the periodic timer to provide an event trigger synchronous with the processing timeslots.

28. The device of claim 27 further comprising:
a session identifier allocator coupled to the port, the session identifier allocator to assign an identifier to each communication session received.

29. The device of claim 28 further comprising:
a queue coupled to the session identifier allocator, the queue to store the assigned session identifiers.

30. The device of claim 27 wherein the timeslot distributor distributes processing timeslots for communication sessions such that there is a difference of less than one of a threshold percentage and a threshold number of communication sessions across the multiple processing time slots.

31. A device comprising:
an input port to receive requests to establish communication sessions;
a timeslot distributor to distribute processing timeslots for communication sessions across multiple processing timeslots according to a load balancing scheme such that there is a difference of less than one of a threshold percentage and a threshold number of communication sessions across the multiple processing timeslots;
a timeslot allocator communicatively coupled to the timeslot distributor and the port, the timeslot allocator to allocate processing timeslots for communication sessions, allocate a session identifier to the communication session, and associate the communication session with the session identifier; and
an output port to communicate the session identifier to a client, the session identifier employed to identify subsequent session information, wherein the client transmits subsequent information corresponding to the communication session synchronous to the allocated processing timeslot.

32. The device of claim 31 further comprising:
a session identifier allocator coupled to the port, the session identifier allocator to assign an identifier to each communication session received.

33. The device of claim 32 further comprising:
a queue coupled to the session identifier allocator, the queue to store the assigned session identifiers.

34. The device of claim 31 further comprising:
a periodic timer coupled to the timeslot distributor, the periodic timer to provide an event trigger synchronous with the processing timeslots.

35. A device comprising:
receiving means for receiving requests to establish communication sessions;
distribution means for distributing processing timeslots for communication sessions across multiple processing timeslots according to a load balancing scheme;
timeslot allocation means for allocating processing timeslots for communication sessions, the timeslot allocation means being coupled to the distribution means and the receiving means; and
a periodic timer coupled to the timeslot distributor, the periodic timer to provide an event trigger synchronous with the processing timeslots.

36. The device of claim 35 further comprising:
session identifier allocation means for assigning an identifier to each communication session received, the session identifier allocation means being coupled to the receiving means.

* * * * *